(12) United States Patent
Takagi et al.

(10) Patent No.: US 7,316,853 B2
(45) Date of Patent: Jan. 8, 2008

(54) AIRBREATHING FUEL CELL

(75) Inventors: Takehisa Takagi, Inuyama (JP); Noboru Owaki, Inuyama (JP); Yukio Naruse, Inuyama (JP); Shoji Nawa, Inuyama (JP); Yasuo Ido, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 217 days.

(21) Appl. No.: 10/462,725

(22) Filed: Jun. 17, 2003

(65) Prior Publication Data

US 2004/0053106 A1    Mar. 18, 2004

(30) Foreign Application Priority Data

Jul. 5, 2002    (JP)    ............................. 2002-196833

(51) Int. Cl.
*H01M 8/18*    (2006.01)
(52) U.S. Cl. ............................. 429/19; 429/12; 429/13; 429/21; 429/23; 429/30; 429/32; 429/34; 429/38; 429/39
(58) Field of Classification Search ................. 429/19, 429/23, 21, 32, 12, 13, 30, 34, 38, 39
See application file for complete search history.

(56) References Cited

U.S. PATENT DOCUMENTS 5,514,486 A * 5/1996 Wilson ......................... 429/30
5,595,834 A   1/1997 Wilson et al.
6,423,437 B1 * 7/2002 Kenyon et al. ................ 429/32
6,623,880 B1 * 9/2003 Geisbrecht et al. ........... 429/12
2002/0192513 A1 * 12/2002 Colbow et al. ................ 429/13

FOREIGN PATENT DOCUMENTS

JP    2002-270212    9/2002

* cited by examiner

*Primary Examiner*—Patrick Joseph Ryan
*Assistant Examiner*—Jane Rhee
(74) *Attorney, Agent, or Firm*—Browdy and Neimark, PLLC

(57) ABSTRACT

An airbreathing fuel cell comprising a power generating cell stack constituted by laminating a plurality of cell parts together, which cell part comprises a polymer electrolyte membrane, an oxygen electrode and a fuel electrode, which are provided on both sides of the polymer electrolyte membrane to be opposed to each other, an oxygen passage plate provided adjacent to the oxygen electrode, and separator plates provided adjacent to an outside of the oxygen passage plate and an outside of the fuel electrode, and a cell stack for removal of moisture, connected to the power generating cell stack and comprising at least one cell, which is constructed in the same manner as the cell part, and to which resistances are connected to be capable of power generation, and wherein moisture generated in the power generating cell stack due to an operation over a long period of time is conducted to the cell stack for removal of moisture together with a fuel, and removed through natural evaporation to outside and around the fuel cell, thus suppressing a decrease in power generating capacity.

5 Claims, 5 Drawing Sheets

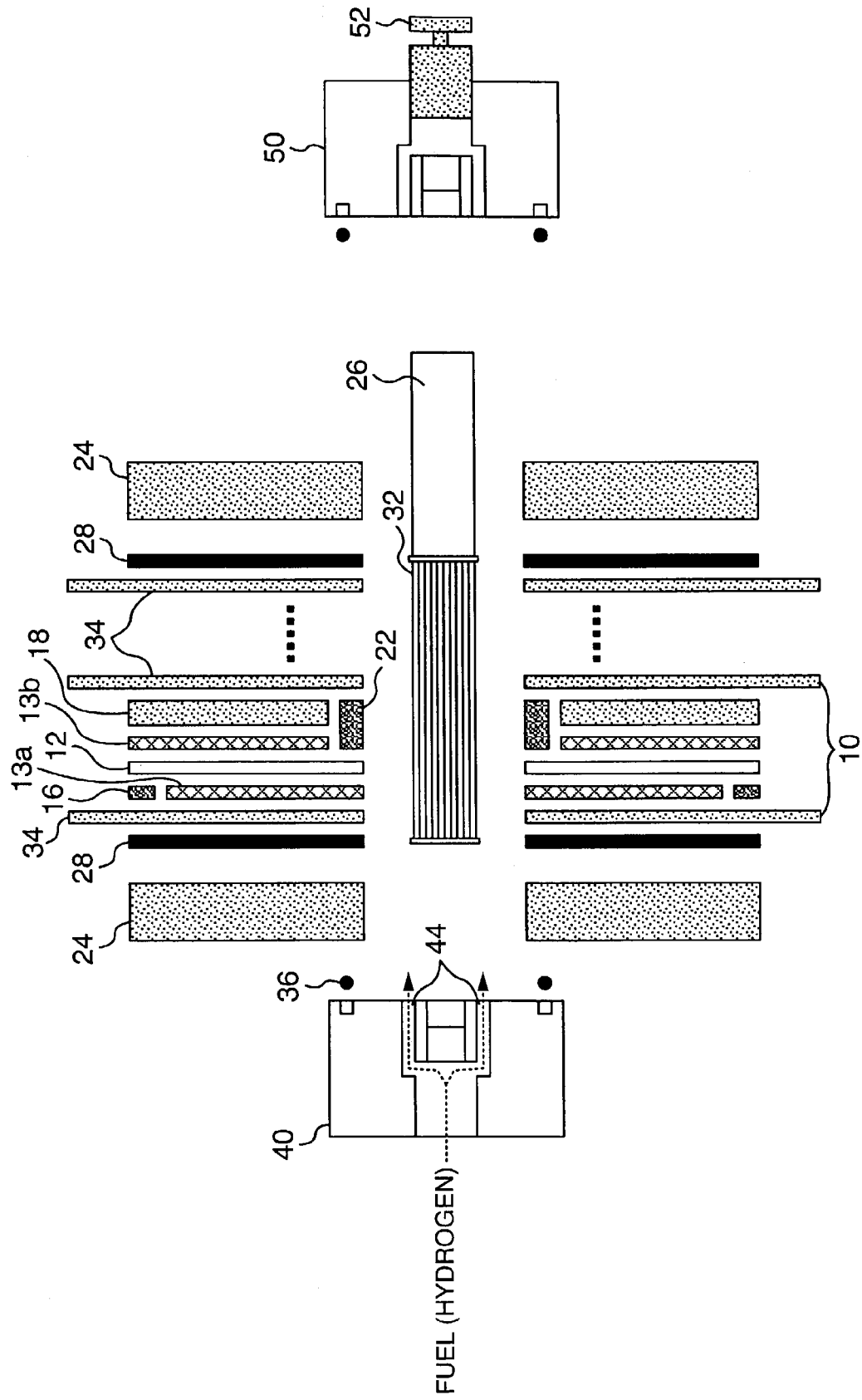

AIRBREATHING FUEL CELL

BACKGROUND OF THE INVENTION

The present invention relates to a fuel cell usable as electric sources and electric generators for outdoor, pleasure trip, household, business machines, or the like, and more particular, to an airbreathing fuel cell capable of removing moisture generated in a pollution-free solid polymer type fuel cell.

Among fuel cells, solid polymer electrolyte fuel cells with hydrogen as a main fuel have been given attention and developed because of low working temperature and high power density. Examples of such fuel cells are described in U.S. Pat. No. 5,595,834 or Japanese Patent Application No. 2001-66109 filed by the applicant of the present application.

As an example of such fuel cells, the inventors of the present application have proposed an airbreathing fuel cell, in which single cells 10 are stacked as shown in FIG. 3. Concretely, the airbreathing fuel cell comprises, as shown in FIG. 8, a fuel electrode 13a provided on an outer periphery thereof with an outer seal 16, an oxygen electrode 13b, an inside of which is sealed by an inner seal 22, and an oxygen passage plate 18 provided adjacent to the oxygen electrode 13b, the fuel electrode, and the oxygen electrode and the oxygen passage plate being provided on both sides of a polymer electrolyte membrane 12. Separator plates 34 arranged on both sides of the fuel electrode 13a and the oxygen passage plate 18 make these elements unitary to form a single cell 10, and a plurality of such single cells 10 are stacked together. In addition, the separator plates 34 are provided with terminals, through which electricity generated is taken out, and serve as collecting plates. Further, a fuel distribution manifold 32 communicated to the fuel electrodes 13a and composed of a sleeve of hydrophilic synthetic fiber yarns is provided to extend through central holes of the single cells 10, end plates 24 are further provided on both ends of a tie bolt 26, which extends centrally through the sleeve, to interpose end gaskets 28 between the end plates 24 and the separator plates 34, and one nut 40 having fuel flow passages 44 and the other nut 50 having a breeder valve 52 interpose O-rings 36 between them and the end plates 24 to clamp and fix the single cells integrally. Since such fuel cell can be made small in size and lightweight, it is suited to a fuel cell of low power.

Also, such a solid polymer electrolyte fuel cell is configured such that a fuel is fed from a center of the one nut 40 to be distributed to the fuel electrodes 13a through the hydrophilic sleeve of the fuel distribution manifold 32.

Thus, with such conventional solid polymer electrolyte fuel cell, moisture is generated in chemical reaction at the time of electrical power generation and discharged to the atmosphere outside and around the respective cells at the initial stage, thus affording supplying a fuel and generating a high electric current. However, with the lapse of time, the generated moisture collects in a portion downstream of the fuel distribution manifold in a fuel inflowing direction, so that a fuel cannot be adequately supplied to the fuel electrodes arranged in a downstream area and the generated electric current will be rapidly decreased since it is generally dominated by electrical power generation in the fuel electrodes.

Also, with solid polymer electrolyte fuel cells, moisture having collected in a fuel distribution manifold is removed by opening a breeder valve 52 provided on a nut 50. Labor for such removal, or provision of a device therefor results in addition of articles of excess configuration to decrease a size of a cell part, which gives rise to a need of taking account of an external shape of the device and cannot be simply coped with in terms of design.

BRIEF SUMMARY OF THE INVENTION

The invention has been thought of in view of the problem, and has its object to provide an airbreathing fuel cell, of which power generating capacity is enhanced by efficiently removing moisture generated in the fuel cell.

Also, another object of the invention is to provide an airbreathing fuel cell, in which removal of moisture generated can be dealt with at a minimum expense by the addition of the same cell stack as that in a power generating part without the provision of any specific means for removal of moisture generated.

To attain the object, an airbreathing fuel cell according to first measures of the invention comprises a power generating cell stack constituted by laminating a plurality of the cell parts together, which cell part comprises a polymer electrolyte membrane, an oxygen electrode and a fuel electrode, which are provided on both sides of the polymer electrolyte membrane to be opposed to each other, an oxygen passage plate provided adjacent to the oxygen electrode, and separator plates provided adjacent to an outside of the oxygen passage plate and an outside of the fuel electrode, and a cell stack for removal of moisture, connected to the power generating cell stack and comprising at least one cell, which is constructed in the same manner as the cell part, and to which resistances are connected to be capable of power generation.

The first measures include the following functions.

Since the cell stack for removal of moisture including at least one cell having the same construction as that of a plurality of cell parts stacked together in the power generating cell stack is connected to the cell parts, even when the power generating cell continuously outputs power over a long period of time to generate moisture in a downstream portion of the fuel distribution manifold, which is provided centrally for supplying of a fuel, in a fuel flow direction, the moisture moves to the cell stack for removal of moisture, which is connected and disposed downstream of the fuel distribution manifold, and electric power is also generated in the cell stack for removal of moisture because resistances are connected to the cell stack for removal of moisture. And while moisture together with a fuel flows into the cell stack for removal of moisture, the moisture together with moisture, which is generated in the cell stack, can be discharged outside through evaporation. Accordingly, it is possible to cancel the decrease in generating efficiency, which moisture collects to cause, in the power generating cell, and to maintain a fixed power generating capacity over a long period of time.

Second measures in the airbreathing fuel cell have a feature in that the cell stack for removal of moisture is provided adjacent to the power generating cell stack.

According to the second measures, since the cell stack for removal of moisture is provided adjacent to the power generating cell, the cell stacks of the same construction assume a configuration, in which parts having substantially the same external shape are extended, whereby it is possible to form the both cell stacks from common stacks and to readily cope with restrictions on a location for installation.

Also, third measures in the airbreathing fuel cell according to the invention have a feature in that the cell stack for removal of moisture and the power generating cell stack are spaced from each other, and fuel distribution manifolds of the both cell stacks are connected to each other for communication.

According to the third measures, in the case where there are restrictions on a location for installation, such as in the case where the power generating cell stack is mounted on a small-sized equipment, the fuel distribution manifold can be extended for connection, or the fuel distribution manifolds of the both cell stacks can be connected to each other by means of a separate connection pipe whereby in the case where difficulty is encountered in terms of a space, the both cell stacks can be installed to be spaced from each other, and a range, in which a location for installation is applied, can be enlarged.

BRIEF DESCRIPTION OF THE DRAWINGS

FIG. 8 is an exploded, cross sectional view showing a conventional airbreathing fuel cell.

DETAILED DESCRIPTION OF THE PREFERRED EMBODIMENTS

Embodiments of the invention will be described in detail below with reference to the drawings.

Figure 1:
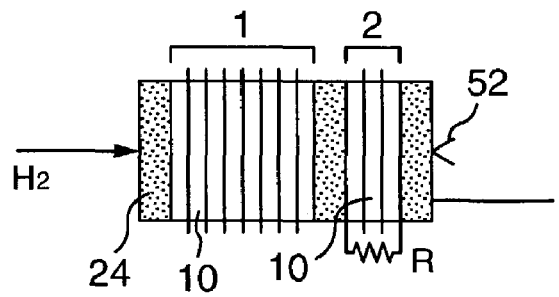
FIG. 1 is a schematic view showing an airbreathing fuel cell according to an embodiment of the invention.
Figure 4:
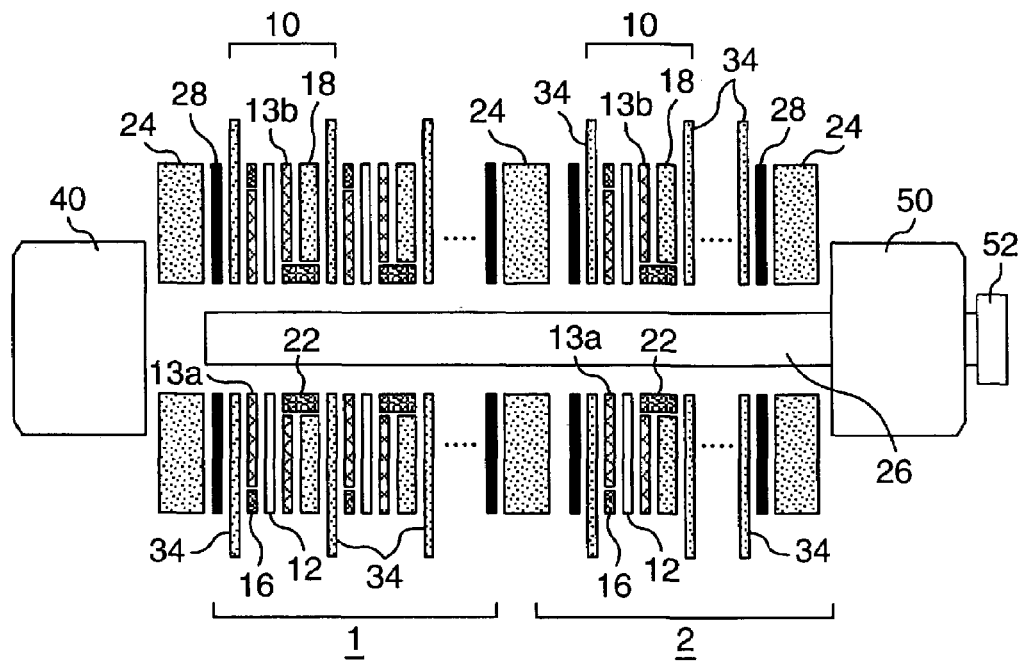
FIG. 4 is an exploded, cross sectional view showing the airbreathing fuel cell according to the embodiment of the invention, shown in FIG. 1.

FIGS. 1 and 4, respectively, are a schematic view and an exploded, cross sectional view, which show an airbreathing fuel cell according to an embodiment of the invention. As shown in FIGS. 1 and 4, a power generating cell stack 1 and a cell stack 2 for removal of moisture interpose therebetween end plates 24 of an insulating material to integrally form the airbreathing fuel cell. The respective cell stack 1, 2 are constructed in the same manner as in conventional examples, and constituted by making a plurality of single cells 10 unitary to comprise a fuel electrode 13a provided on an outer periphery thereof with an outer seal 16, an oxygen electrode 13b, an inside of which is sealed by an inner seal 22, and an oxygen passage plate 18 provided adjacent to the oxygen electrode 13b, the fuel electrode, and the oxygen electrode and the oxygen passage plate being provided on both sides of a polymer electrolyte membrane 12 to be interposed between separator plates 34. A plurality of such cells 10 constructed in the above manner are stacked together to constitute the power generating cell stack 1.

The cell stack 2 for removal of moisture is joined to the power generating cell stack 1 with an end plate 24 interposed therebetween. Like the cells 10 constituting the power generating cell stack 1, the cell stack 2 for removal of moisture is constituted by cells 10, which comprise a fuel electrode 13a provided on an outer periphery thereof with an outer seal 16, an oxygen electrode 13b provided on an inner periphery thereof with a common inner seal 22, and an oxygen passage plate 18, which electrodes and oxygen passage plate are provided between separator plates 34, the fuel electrode being arranged on one side of the polymer electrolyte membrane 12, and the oxygen electrode and the oxygen passage plate being arranged on the other side of the polymer electrolyte membrane. The number of the cells 10 is determined in accordance with electric power generation of the power generating cell stack 1, and the cell stack 2 for removal of moisture is made unitary between the separator plates 34 and the end plates 24 with end gaskets 28 therebetween. Further, resistances R are connected between the separator plates 34 disposed outside and between the separator plates 34 disposed inside, so that the cell stack 2 acts to generate electricity while consuming a fuel.

The power generating cell stack 1 and the cell stack 2 for removal of moisture are made unitary, as shown in FIG. 4, by mounting nuts 40, 50 on both ends of a tie bolt 26, which extends centrally through holes provided centrally of the cells 10 and has a fuel distribution manifold (not shown), and clamping the nuts.

In this manner, with the airbreathing fuel cell, which is constituted by adjoining the power generating cell stack 1 and the cell stack 2 for removal of moisture to each other and making them unitary, when hydrogen $H_2$ being a fuel is supplied from a central area through the fuel distribution manifold in a direction of an arrow as shown in FIG. 1, oxygen contained in an air supplied to the oxygen electrode 13b through the oxygen passage plate 18 from outer peripheries of the respective cell stacks 1, 2 and a fuel supplied to the fuel electrode 13a from central portions of the respective cell stacks 1, 2 react with each other in the polymer electrolyte membrane 12 to generate an electric potential difference between the both electrodes 13a, 13b to produce electromotive forces, so that power generation is caused between the both separator plates 34 of the respective cells 10.

Figure 7:
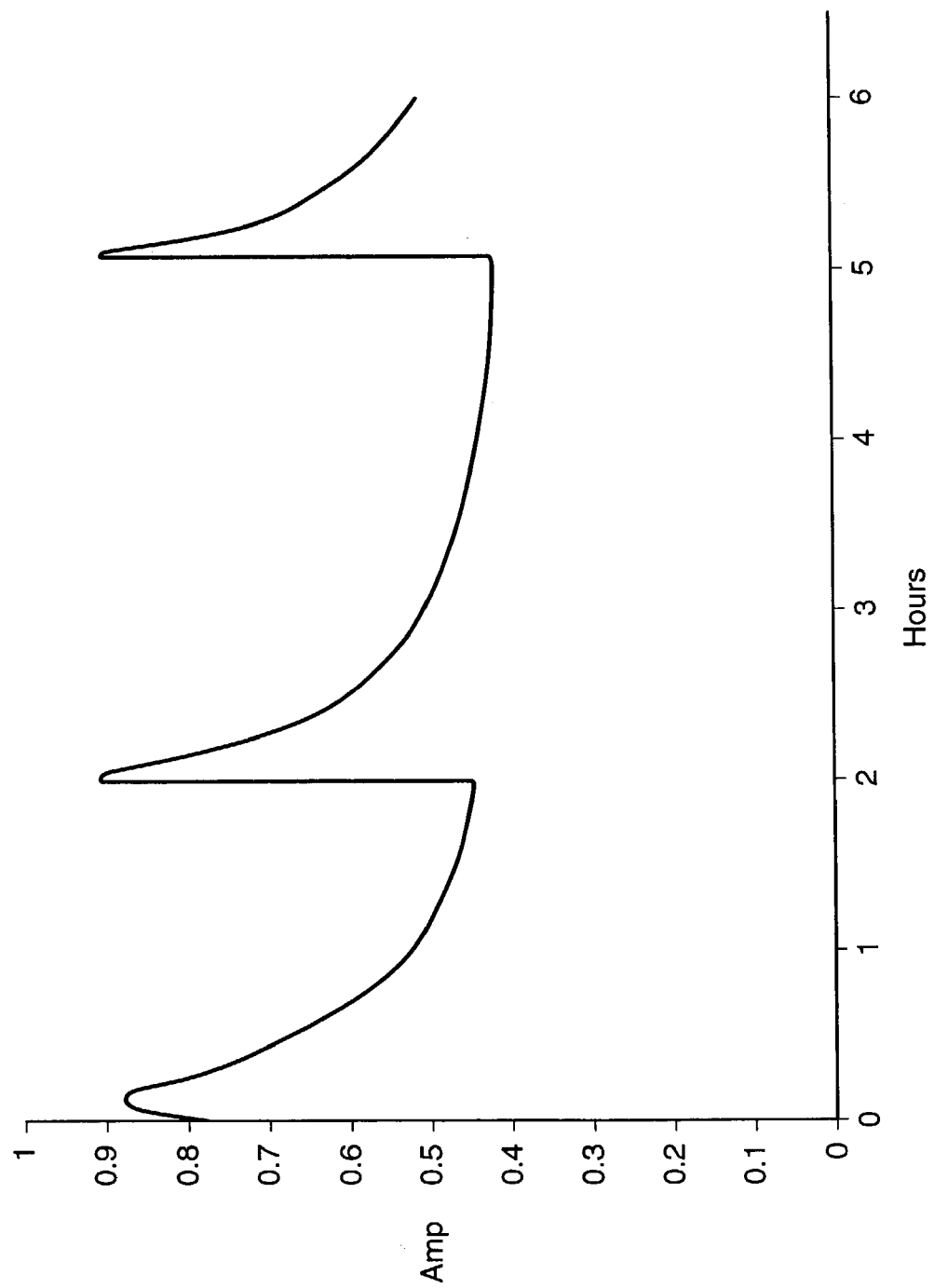
FIG. 7 is a performance curve of a conventional airbreathing fuel cell.

In a conventional power generation with only a power generating cell stack 1 and without connection of a cell stack 2 for removal of moisture, when moisture generated inside, in particular, in those central portions of respective cells, which serve as fuel supplying parts, due to power generating reaction becomes too much in long-term use to transpire outside outer peripheries of the respective cells due to evaporation, it will collect in a fuel distribution manifold to narrow a fuel supply passage to restrict supplying of a fuel, which results in a rapid decrease in power generating capacity as shown in FIG. 7. In addition, as apparent from FIG. 7, while electric power generation can be temporarily restored by opening a breeder valve 52 to remove moisture, it will be again decreased because moisture is not adequately discharged.

Figure 6:
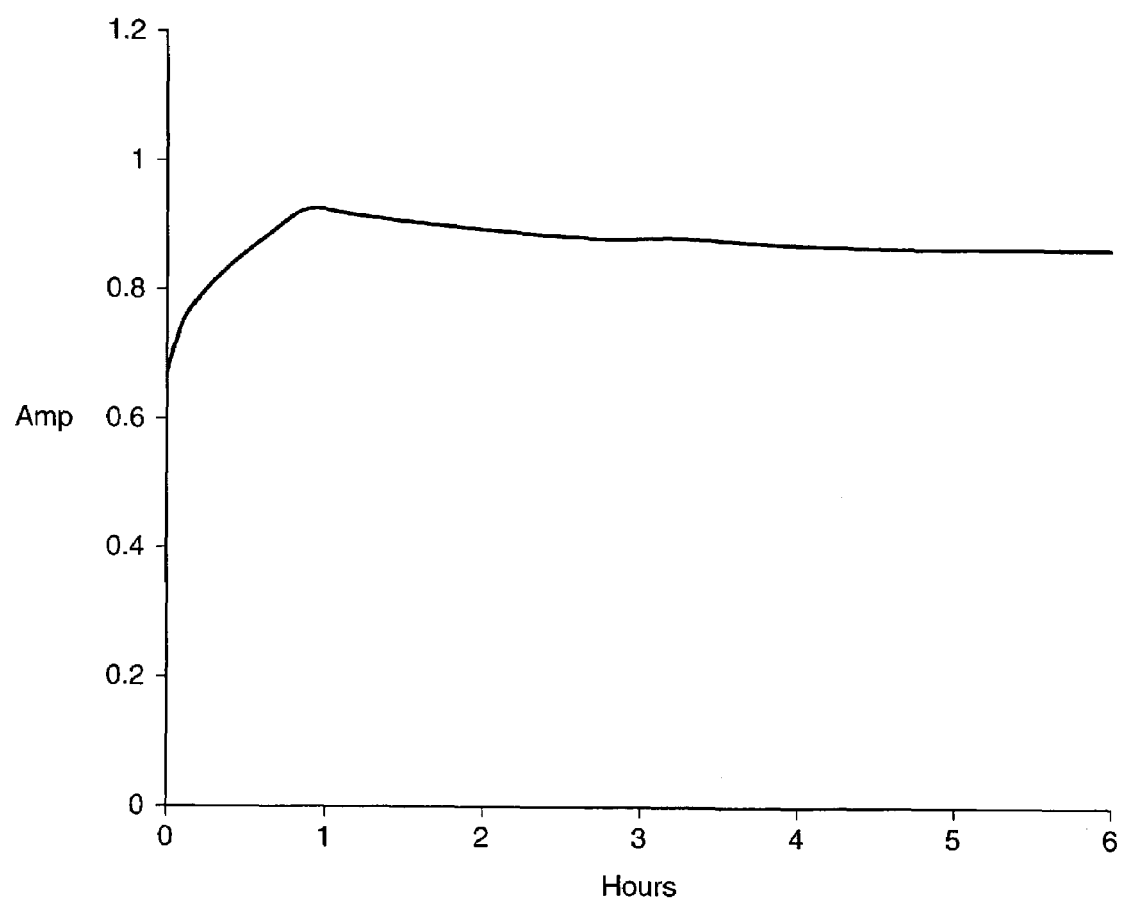
FIG. 6 is a performance curve of the airbreathing fuel cell according to the embodiments of the invention.

In the case where the cell stack 2 for removal of moisture is connected to the power generating cell stack 1, however, moisture having collected in the fuel distribution manifold 32 moves to the cell stack 2 for removal of moisture together with a fuel, which is fed to the cell stack 2 for removal of moisture from the power generating cell stack 1, so that moisture generated in power generation can be removed through evaporation to the outside or discharge by opening of the breeder valve 52. Accordingly, since moisture generated will not collect in the power generating cell stack 1 and moisture generated is treated by the cell stack 2 for removal of moisture, the power generating capacity can be maintained high and constant over a long term as shown in FIG. 6.

Figure 2:
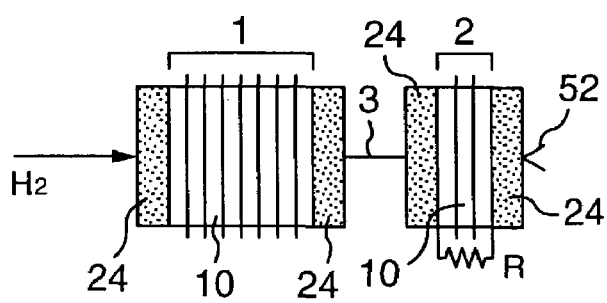
FIG. 2 is a schematic view showing an airbreathing fuel cell according to another embodiment of the invention.
Figure 3:
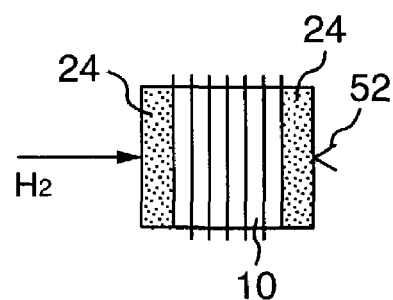
FIG. 3 is a schematic view showing a conventional airbreathing fuel cell.

In the embodiment, while the power generating cell stack 1 and the cell stack 2 for removal of moisture are made adjacent to each other with the end plates 24 therebetween to be made unitary so as to be applicable to generation of small electric power, the power generating cell stack 1 and the cell stack 2 for removal of moisture may be separated from each other by a connection 3 and connected to each other, as shown in FIG. 2, so as to be applied to generation of large electric power. The connection 3 is made of an appropriate material and formed to have flexibility at need, and pipes connect between fuel supply parts disposed centrally of the respective cell stacks 1, 2 to be able to take out a fuel and moisture having collected in the power generating cell stack 1 to conduct the moisture together with the fuel to the cell stack 2 for removal of moisture.

Figure 5:
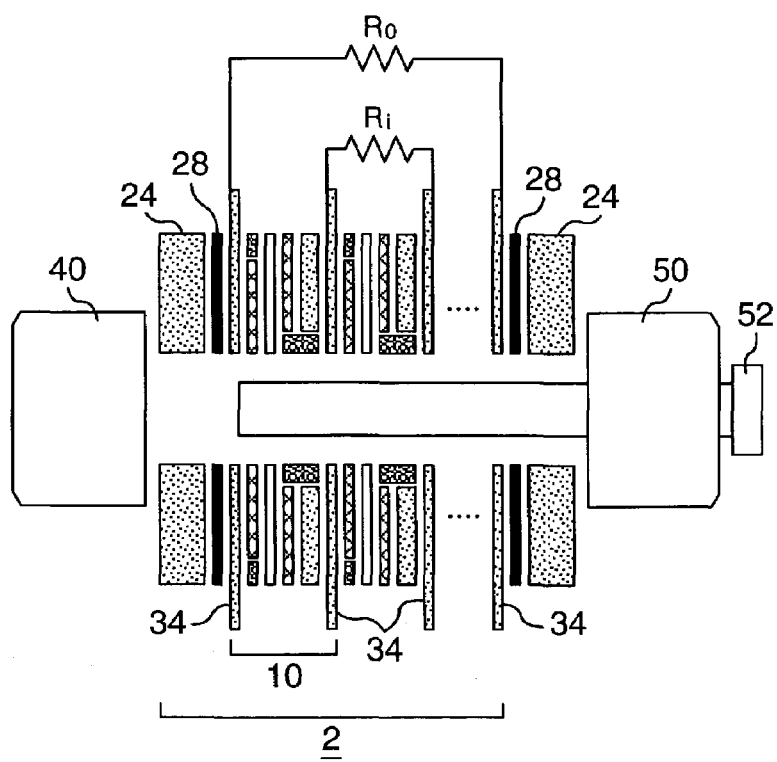
FIG. 5 is an exploded, cross sectional view showing a cell stack for removal of moisture in the airbreathing fuel cell according to another embodiment of the invention, shown in FIG. 2.

With a cell stack 2 for removal of moisture, a plurality of cells 10 conformed to the generation capacity of the power generating cell stack 1 are stacked together, as shown in FIG. 5, and can be made unitary by mounting nuts 40, 50 on both ends of a tie bolt 26 and clamping the nuts in the same manner as in the fuel cell shown in FIG. 4. The respective cells 10 is the same in construction as those shown in FIG. 4. External resistances are connected to separator plates 34 in the cell stack 2 for removal of moisture such that an outside external resistance Ro is mounted to the separator plates 34 disposed outside, or an inside external resistance Ri is mounted to the separator plates 34 disposed inside. The cell stack 2 for removal of moisture acts to generate electricity while consuming a fuel, and the fuel and moisture having collected in the power generating cell stack 1 are conducted. That moisture, which cannot be discharged outside through evaporation but has collected, can be discharged by opening the breeder valve 52 in the cell stack 2 for removal of moisture.

Accordingly, with an airbreathing fuel cell for generation of large electric power, in which a large amount of moisture is generated in the power generating cell stack 1, moisture having collected in the fuel distribution manifold 32 moves through the connection 3 to the cell stack 2 for removal of moisture, simultaneously with supplying of a fuel, and while the moisture is discharged to the outer periphery of the cell stack through evaporation, that moisture, which cannot be removed through evaporation but has collected in a fuel supplying portion disposed centrally of the cell stack, can be discharged by opening the breeder valve 52. At that time, the generated moisture does not collect in the power generating cell stack 1, so that the fuel is smoothly fed to the respective cells 10 whereby the electric power generation shown in FIG. 6 is obtained.

Also, since the both cell stacks 1, 2 are connected to each other by the connection 3, when it is impossible to adjoin them to each other in terms of a location for installation, the connection can be extended suitably for enlargement in application.

As described above, the airbreathing fuel cell according to the invention produces the following effect owing to the constitution described above.

In the airbreathing fuel cell, connected to the power generating cell stack, in which a plurality of cell parts are stacked together, is the cell stack for removal of moisture, which includes at least one cell having the same construction as that of the cell parts. Therefore, even when the power generating cell continuously outputs power over a long period of time to generate moisture in a downstream portion of the fuel distribution manifold in a fuel flow direction, the moisture moves to the cell stack for removal of moisture, which is connected and disposed downstream of the fuel distribution manifold, simultaneously with inflowing of a fuel, and power generation in the cell stack for removal of moisture affords discharging the moisture outside through evaporation together with moisture generated. Accordingly, there is produced an excellent effect that it is possible to cancel that decrease in generating efficiency, which is caused when moisture collects, in the power generating cell, and to maintain a fixed power generating capacity over a long period of time.

Also, since the cell stack for removal of moisture is provided adjacent to the power generating cell, cell stacks of the same construction assume a configuration, in which parts having substantially the same external shape are extended, whereby it is possible to form the both cell stacks from common stacks and to readily cope with restrictions on a location for installation, as encountered in small-sized equipments.

Further, there are produced excellent effects that in the case where a large quantity of electricity is demanded of the power generating cell, and in the case where there are restrictions on a location for installation, a connection affording adjustment in length can connect with fuel distribution manifolds of the both cell stacks, and also in the case where difficulty is encountered in terms of a space, the both cell stacks can be installed to be spaced from each other and the cell stack for removal of moisture can be freely adjusted in size and range, in which a location for installation is applied, corresponding to the power generating cell, thus enabling enhancing a quality of correspondence.

What is claimed is:

1. An airbreathing fuel cell having end plates, a first cell stack disposed between the two end plates, a fuel distribution manifold disposed centrally of the first cell stack to feed a fuel thereto, a single tie bolt extended centrally through the fuel distribution manifold and the first cell stack to make them unitary, and fixing nuts screwed on both ends of the tie bolt to unitarily clamp the first cell stack between the end plates with O-rings or the like therebetween, the first cell stack being a power generating cell stack constituted by laminating a plurality of single cells together, wherein each single cell comprises a polymer electrolyte membrane, an oxygen electrode and a fuel electrode, which single cells are each provided on both sides of the polymer electrolyte membrane to be opposed to each other, an oxygen passage plate provided adjacent to the oxygen electrode, and separator plates provided adjacent to an outside of the oxygen passage plate and an outside of the fuel electrode, and moisture removal means for removal of moisture from said power generating cell stack, said moisture removal means comprising a second cell stack connected to the power generating cell stack in communication with said fuel distribution manifold and comprising at least one cell, which is constructed in the same manner as the power generating cell stack so as to make power generation possible, wherein external resistances are connected between the separator plates of said least one cell so as to make a closed circuit, said resistances being adapted to become heated by said second cell stack in order to remove moisture through evaporation.

2. The airbreathing fuel cell according to claim 1, wherein the cell stack for removal of moisture is provided adjacent to the power generating cell stack.

3. The airbreathing fuel cell according to claim 1, wherein the cell stack for removal of moisture and the power generating cell stack are spaced apart from each other, and fuel distribution manifolds of the both cell stacks are connected to each other for communication.

4. In an airbreathing fuel cell comprising a power generating cell stack and a fuel distribution manifold adapted to feed fuel to said power generating cell stack,
the improvement comprising a moisture removal cell stack disposed downstream of said power generating cell stack and downstream of said fuel distribution manifold,
said moisture removal cell stack either being spaced apart from said power generating cell stack or being adjacent but separated from said power generating cell stack by an insulating end plate, and said moisture removal cell stack comprising means for removing moisture through evaporation, said means for removing moisture comprising at least one resistance connected in a closed circuit in said moisture removal cell stack to generate electrical power in said moisture removal cell stack that creates heat for removing moisture from sail moisture removal cell stack through evaporation, and
means for permitting a downstream flow of moisture accumulated from said power generating cell stack to pass from said power generating cell stack to said moisture removal flow stack.

5. The airbreathing fuel cell of claim 4 wherein said power generating cell stack and said moisture removal cell stack are spaced apart from one another and said means for permitting flow of moisture from said power generating cell stack to said moisture removing cell stack comprises a connection (3) adapted to permit said downstream flow of moisture.

* * * * *